United States Patent
Ly et al.

(10) Patent No.: US 10,993,180 B2
(45) Date of Patent: Apr. 27, 2021

(54) WAKE UP SIGNALING TECHNIQUE

(71) Applicant: QUALCOMM Incorporated, San Diego, CA (US)

(72) Inventors: Hung Ly, San Diego, CA (US); Peter Pui Lok Ang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/824,623

(22) Filed: Nov. 28, 2017

(65) Prior Publication Data

US 2019/0166556 A1    May 30, 2019

(51) Int. Cl.
*H04B 7/06* (2006.01)
*H04J 11/00* (2006.01)
(Continued)

(52) U.S. Cl.
CPC ...... *H04W 52/0229* (2013.01); *H04B 7/0617* (2013.01); *H04B 7/0695* (2013.01);
(Continued)

(58) Field of Classification Search
CPC . H04B 7/0617; H04B 7/0695; H04J 11/0079; H04L 5/0053–0057;
(Continued)

(56) References Cited

U.S. PATENT DOCUMENTS

2014/0126442 A1 * 5/2014 Jafarian ............ H04W 52/0212
2016/0128128 A1   5/2016 Ang et al.
(Continued)

FOREIGN PATENT DOCUMENTS

WO    2016204933 A1    12/2016

OTHER PUBLICATIONS

Huawei., et al., "On 'Wake-Up Signal' for eFeMTC", 3GPP Draft; R1-1707018, 3rd Generation Partnership Project (3GPP), Mobile Competence Centre, 650, Route Des Lucioles ; F-06921 Sophia-Antipolis Cedex, France, vol. RAN WG1, No. Hangzhou, China; May 15, 2017-May 19, 2017, May 14, 2017 (May 14, 2017), XP051272248, 7 Pages, Retrieved from the Internet: URL: http://www.3gpp.org/ftp/Meetings_3GPP_SYNC/RAN1/Docs/ [retrieved on May 14, 2017].
(Continued)

*Primary Examiner* — Timothy J Weidner (74) *Attorney, Agent, or Firm* — Changwoo Yang (57) ABSTRACT

Systems and methods for providing wake-up radio (WUR) signals are disclosed. In accordance with some implementations, a base station determines a numerology for WUR signaling and a WUR signaling configuration. The base station may transmit a WUR signal to one or more UEs based on the determined numerology and the signaling configuration. The base station, in response to transmitting a WUR signal, may transmit a paging message to the one or more UEs. Systems and methods for monitoring WUR signals are also disclosed. In accordance with some implementations, a wireless device determines numerology for WUR signal and WUR signaling configuration. A wireless device may monitor a WUR signal based on the determined numerology and the signaling configuration. Other aspects, embodiments, and features are also claimed and described.

20 Claims, 7 Drawing Sheets

(51) Int. Cl.
*H04L 5/00* (2006.01)
*H04W 48/08* (2009.01)
*H04W 52/02* (2009.01)
*H04W 72/04* (2009.01)
*H04W 76/28* (2018.01)
*H04W 84/02* (2009.01)
*H04W 88/06* (2009.01)
*H04W 88/10* (2009.01)
*H04W 92/10* (2009.01)

(52) U.S. Cl.
CPC ........ *H04J 11/0079* (2013.01); *H04L 5/0053* (2013.01); *H04L 5/0092* (2013.01); *H04W 48/08* (2013.01); *H04W 52/0216* (2013.01); *H04W 52/0219* (2013.01); *H04W 52/0245* (2013.01); *H04W 52/0274* (2013.01); *H04W 72/042* (2013.01); *H04W 72/0406* (2013.01); *H04W 72/046* (2013.01); *H04W 72/0446* (2013.01); *H04W 72/0453* (2013.01); *H04W 76/28* (2018.02); *H04W 84/02* (2013.01); *H04W 88/06* (2013.01); *H04W 88/10* (2013.01); *H04W 92/10* (2013.01); *Y02D 30/70* (2020.08)

(58) Field of Classification Search
CPC ...... H04L 5/0091–0098; H04W 24/02; H04W 24/08; H04W 36/0055–0077; H04W 48/08–16; H04W 52/0209–0248; H04W 52/0261; H04W 52/0274; H04W 52/028; H04W 72/04–046; H04W 76/28; H04W 92/10; Y02D 70/24

See application file for complete search history.

(56) References Cited

U.S. PATENT DOCUMENTS

2016/0374022 A1   12/2016  Ang et al.
2017/0273058 A1    9/2017  Agiwal et al.
2018/0077680 A1*  3/2018  Tenny .................. H04W 16/28
2018/0199287 A1*  7/2018  Lee ..................... H04W 72/042
                                                                                           370/311
2018/0288706 A1* 10/2018  Fang ................. H04W 52/0235
                                                                                           370/311
2019/0289549 A1*  9/2019  Lim .................. H04W 52/0229

OTHER PUBLICATIONS

International Search Report and Written Opinion—PCT/US2018/059455—ISA/EPO—dated Mar. 14, 2019.
Qualcomm Incorporated: "Efficient Monitoring of DL Control Channels", 3GPP Draft; R1-1720417, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 18, 2017 (Nov. 18, 2017), XP051369980, pp. 1-11, Retrieved from the Internet: URL: http://www.3gpp.org/ftp/tsg_ran/WG1_RL1/TSGR1_91/Docs/ [retrieved on Nov. 18, 2017].

* cited by examiner

WAKE UP SIGNALING TECHNIQUE

TECHNICAL FIELD

Aspects of the present disclosure relate generally to wireless communication systems, and more particularly, to radio resource management. Certain embodiments of the technology discussed below can enable and provide features and techniques for efficient and power-conserving communication systems.

INTRODUCTION

As user equipment (UE) get smaller and the services offered thereon grow, users desire that their UE have increased battery life. A solution to increase battery life is to include a larger battery that stores more energy. Yet such a solution is limited by the UE form factor.

Rather than increasing battery life by via battery size and storage capacity, attempts to increase power efficiency includes reducing UE power consumption. A battery of the same storage capacity is capable of lasting longer because less of the stored energy is being used. Demand for reducing UE's power consumption in wireless communications systems continues to increase.

The 5th Generation (5G) New Radio (NR) communications technology, being designed for use in a wide range of spectrum, is envisaged to expand and support diverse usage scenarios and applications. 5G use cases may include enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. Some 5G-enabled wireless devices may communicate using a portion of a frequency spectrum. Such devices may operate in accordance with power constraints and may in some cases affect throughput for the wireless communications system. Improved techniques for reducing power consumption may be desired for 5G NR communication systems, particularly in 5G NR communication systems with power-limited wireless devices.

BRIEF SUMMARY OF SOME EXAMPLES

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

Due to the desirability for reduced UE power consumption in 5G NR, new approaches may be desirable to improve UE's power consumption in idle mode by improving the paging mechanism using a wake up process. A UE in an idle mode may be operating in a low powered state. In an example, a UE in lower powered state may turn off specific components which may include components of a transceiver.

Described herein are various aspects related to a wireless communication system (e.g., 5G NR system). Example aspects include paging techniques for waking up a UE in an off duration of Idle-Discontinuous Reception (I-DRX) to monitor a wake-up-radio (WUR) signal (without requiring to monitoring PDCCH). In an aspect, a base station and a UE may agree on a numerology and resources to be used so that the base station can communicate WUR signals to the UE and so that the UE can determine the presence of the WUR signals. In an aspect, numerology and resources to be used for WUR signals for successful communication require agreements between the base station and the UE on aspects not present in previous wireless communication systems. The base station and the UE can agree on a numerology timing resource, and frequency resources to be used for the WUR signals. Such techniques enable communication of WUR signals from the base station to the UE and can lead to reduced UE power consumption.

Methods and devices implementing methods of various embodiments may enable reduction of UE power consumption by selecting a numerology for wake-up-radio (WUR) signaling, determining a WUR-signaling configuration comprising time resource and/or frequency resource, transmitting one or more WUR signals, based at least on the numerology and the determined WUR-signaling configuration, to one or more wireless devices, and transmitting a paging message to the one or more wireless devices after transmitting one or more WUR signals.

In some embodiments, determination of numerology may be based on numerology of SYNC signal, numerology of PDCCH and/or PDSCH carrying remaining minimum system information (RMSI), numerology of paging channels, numerology of control and/or data multiplexed in the same time slot, or a combination thereof. In some embodiments, determination of WUR-signaling may be based on SYNC signal, common control resource set (CORESET), or a combination thereof. In some embodiments, transmitting one or more WUR signals may be in response to determining the one or more wireless devices are in a low powered operation. In some embodiments, an indication of WUR-signaling support capability may be transmitted to one or more wireless devices. In some embodiments, one or more WUR signals may be quasi-collocated with SYNC signal with respect to spatial parameter, gain, delay, and/or Doppler.

Methods and devices implementing methods of various embodiments may enable reduction of UE power consumption by determining numerology for wake-up-radio (WUR) signaling, determining a WUR-signaling configuration comprising time resource and/or frequency resource, and monitoring one or more WUR signals based at least on the determined numerology and the determined WUR signaling configuration.

In some embodiments, one or more paging messages may be monitored in response to receiving the one or more WUR signals. In some embodiments, determination of numerology may be based on numerology of SYNC signal, numerology of PDCCH and/or PDSCH carrying remaining minimum system information (RMSI), numerology control and/or data multiplexed in the same time slot, receiving the numerology in system information (SI) and/or radio resource control (RRC) message, or a combination thereof. In some embodiments, determination of WUR-signaling configuration may be based on SYNC signal, common control resource set (CORESET), receiving the WUR-signaling configuration in system information (SI) and/or radio resource control (RRC) message, or a combination thereof. In some embodiments, monitoring one or more WUR signals may comprise monitoring one or more beams used for acquiring one or more SYNC signals. In some embodiments, receiving one or more WUR signals may be based on one or more beams used for acquiring one or more SYNC signals.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF THE DRAWINGS

To facilitate a fuller understanding of aspects described herein, reference is now made to the accompanying drawings. These drawings should not be construed as limiting the present disclosure, but are intended to be illustrative only.

DETAILED DESCRIPTION

In wireless communication systems such as Long Term Evolution (LTE) and 5G NR, UEs generally monitor Physical Downlink Control Channel (PDCCH) continuously. Continuous monitoring causes high volume of use and this can exhaust or drain UE battery power. One technique to address power conservation is Discontinuous Reception (DRX) mode.

While in Radio Resource Control (RRC) Idle mode of DRX operation (known as DRX in RRC Idle or I-DRX), the UE operates to monitor PDCCH discontinuously. This may be accomplished by a UE monitoring for P-RNTI in PDCCH only at predetermined periods, such as every 60 ms or 100 ms. This periodic monitoring can reduce UE power consumption. I-DRX mode is in part designed for page monitoring and is optimized for reception only operation. In contrast to I-DRX mode, Connected DRX (C-DRX) mode is designed for a RRC connection between the UE and eNodeB where the UE is expected to receive and transmit.

In C-DRX mode operation, even if the traffic is downlink mobile termination (MT) data, the UE needs to transmit in the uplink to facilitate control signaling of data, such as feedback acknowledgement for the decoded data. Accordingly, the C-DRX mode provides an "ON duration" wherein the UE is operable to receive and transmit and the UE monitors the PDCCH.

I-DRX still causes UE power consumption because I-DRX requires the UE to continuously monitor PDCCH during the on-duration of the I-DRX cycle to determine whether there is any paging intended to it. UE power consumption during on-duration of I-DRX cycle is significant because the UE needs to continuously monitor and decode PDCCH. To further address power consumption, in LTE and specifically in enhanced machine-type communication (eMTC) and narrowband Internet of Things (NB-IOT), a wake-up-radio (WUR) signal has been introduced. When WUR signals are used, UEs only monitor for WUR signal during the on duration of I-DRX and does not monitor PDCCH. A UE monitors and decodes PDCCH only when the UE detects a WUR signal. Upon monitoring and decoding PDCCH, if the UE detects that paging is intended to it then the UE will decode PDSCH. If a UE does not detect a WUR signal, the UE returns to off mode and thus skips monitoring and decoding PDCCH. Thus, WUR signal usage results in reduction of UE power consumption (e.g., when there is no WUR signal by not monitoring and decoding PDCCH).

WUR signaling would be beneficial to 5G New Radio (NR) in reducing UE power consumption. Yet incorporating WUR signal to 5G NR generally requires resolution of various aspects not present in LTE. Differences between 5G NR and LTE include flexible numerology, scalable transmission time interval (TTI), and self-contained subframe. One main difference concerning WUR signals is the numerology, i.e., subcarrier spacing and symbol length.

LTE supports a single numerology. That is, in LTE there is only one type of subcarrier spacing (15 kHz).

Yet, 5G NR supports multiple numerology. Supported numerology can be 15, 30, 60, 120, 240, and 480 kHz. Because of the variability of numerology, a base station and a user equipment (UE) may resolve what numerology will be used for WUR signals and subsequently resolve timing and frequency configuration for the transmission and reception of WUR signals.

The detailed description set forth below in connection with the appended drawings is intended as a description of various configurations and is not intended to represent the only configurations where the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

In an implementation, when using techniques for waking a UE in an off duration of I-DRX only to monitor WUR signals in a 5G NR system, the numerology of the WUR signals may be based on a numerology of a known signal. In an aspect, the numerology of the WUR signals may be the same numerology as a known signal. For example, the WUR signal numerology may have the same numerology as a SYNC signal. For example, the WUR signal numerology may have the same numerology as PDSCH carrying remaining minimum system information (RMSI) or PDCCH that carries scheduling information for PDSCH carrying RMSI. For example, WUR signal numerology may have the same numerology of the paging channels. For example, the WUR signal numerology may have the same numerology as the control and/or data message multiplexed in the same time slot as the WUR signal. In an alternative implementation, the numerology for the WUR signals may be signaled by a base station to a UE using system information (SI) or a radio resource control (RRC) message.

In an implementation, when using the techniques for waking up a UE in an off duration of I-DRX only to monitor a WUR signal in a 5G NR system, timing and frequency resources for WUR signals may be based on a configuration of a known signal. In an aspect, a subset of a WUR signaling configuration may be the same as a configuration of a known signal and another subset of the WUR configuration may be related to a configuration of the known signal. For example, the WUR signal may have the same bandwidth and center frequency as a SYNC signal and be pre-determined timing offset away from the SYNC signal. For example, the WUR signal may follow the same configuration as the common control resource set (CORESET) used to transmit common PDCCH. In an alternative implementation, the configuration of the WUR signal may be signaled from the base station to the UE using SI or a RRC message.

Each of the aspects described above are performed or implemented in connection with FIGS. 1-7 and are described in more detail below.

Figure 1:
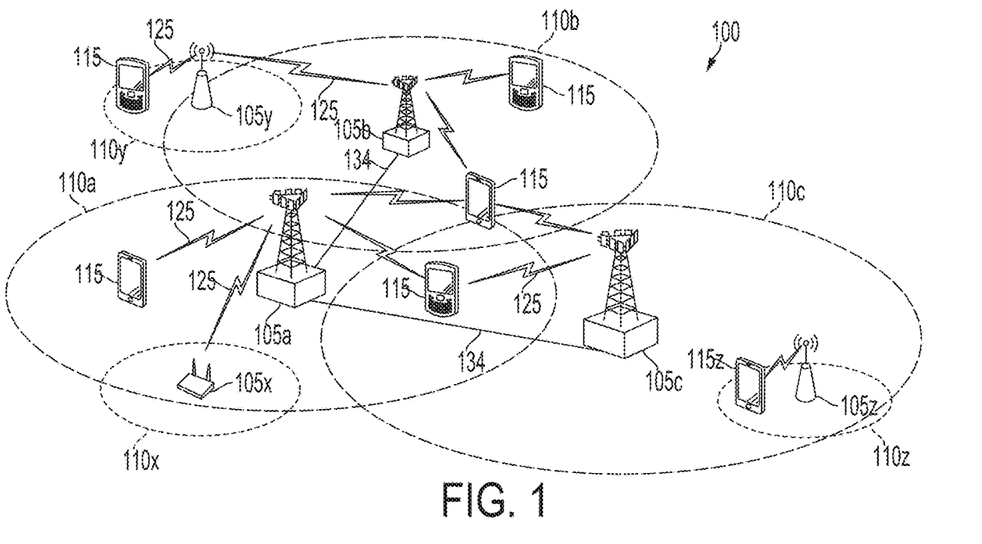
FIG. 1 illustrates an example of a wireless communications system (e.g., a 5G NR system) where one or more of the presently described aspects may be deployed.

Referring to FIG. 1, in an aspect, wireless network 100 includes a number of base stations, referred to herein as base station 105 and other network entities. A base station may be a station that communicates with the UEs and may also be referred to as a node B, an access point, and the like. Each base station 105 may provide communication coverage for a particular geographic area. The term "cell" can refer to this particular geographic coverage area of a base station and/or a base station subsystem serving the coverage area, depending on the context. In implementations of wireless network 100 herein, base station 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105a, 105b and 105c are macro base stations for the macro cells 110a, 110b and 110c, respectively. Base stations 105x, 105y, and 105z are small cell base stations, and may include pico or femto base stations that provide service to small cells 110x, 110y, and 110z, respectively. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

UEs 115 are dispersed throughout wireless network 100, and each UE may be stationary or mobile. It should be appreciated that, although a mobile apparatus is commonly referred to as user equipment (UE), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro base stations, pico base stations, femto base stations, relays, and the like. In FIG. 1, communication links 125 indicates wireless transmissions between a UE and a serving base station. A serving base station typically is a base station designated to serve the UE on the downlink and/or uplink, or desired transmission between base stations. Although backhaul communication 134 is illustrated as wired backhaul communications that may occur between base stations, it should be appreciated that backhaul communications may additionally or alternatively be provided by wireless communications.

Figure 2:
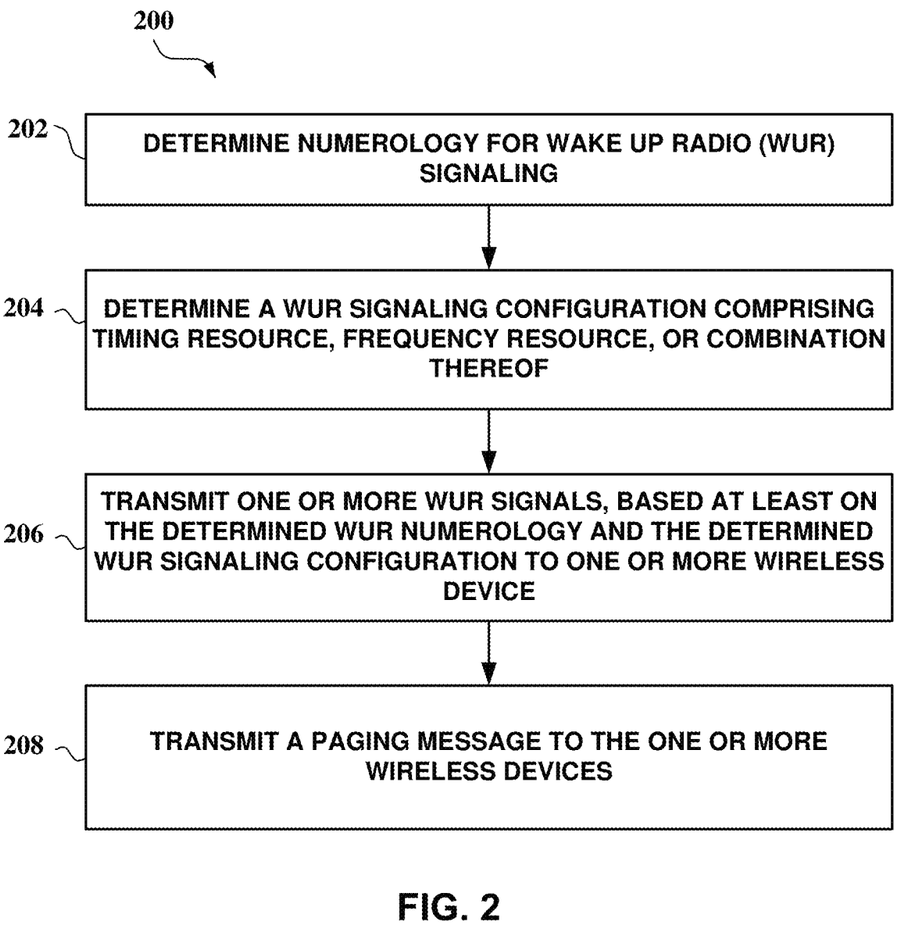
FIG. 2 illustrates an example of a technique used for providing wake-up-radio (WUR) signals in a wireless communications system, according to one or more of the presently described aspects.

Referring to FIG. 2, in an operational aspect, a network entity, such as base station 105 in FIG. 1, may perform one or more aspects of a method 200 for providing a WUR signal to one or more UEs in a 5G NR system, such as UE 115 in FIG. 1. For example, the method 200 will allow the base station to send WUR signals that one or more UEs can monitor. This feature may lead to reduction in UE power consumption using the wake up procedure for monitoring paging by a UE in I-DRX.

In an aspect, at block 202, the method 200 may include determining numerology for WUR signals. In an aspect, determining numerology for WUR signals may include determining subcarrier spacing and symbol length of WUR signals. In some examples, numerology of the WUR signal may be determined to be the same numerology as a SYNC signal wherein the SYNC signal allows the UE to synchronize in time and frequency with a base station. In some examples, numerology of WUR signals may be determined to be the same numerology as PDCCH or PDSCH carrying the remaining minimum system information (RMSI) of the cell. The numerology information of the PDCCH or PDSCH carrying RMSI may be available upon decoding PBCH. In some examples, numerology of WUR signals may be determined to be the same numerology as the data or control signal that is multiplexed in the same time slot as the WUR signal. In some examples, the WUR signal numerology may have the same numerology as the paging channels. In other examples, the numerology of WUR signals may be communicated from a base station to a UE. In such example, the base station may signal the WUR signal numerology in system information (SI) and/or in a radio resource control (RRC) message. The determination may be based on specifications in standards, specified by an operator, and/or based on static parameters including cell id, frequency band used. The determination may be dynamic. For example, determination may be based on the channel condition and/or usage of resource.

In an aspect, at block 204, the method 200 may include determining WUR signaling configuration. In an aspect, agreeing on WUR signal numerology is not sufficient for communicating WUR signals between a base station and a UE. Additionally, agreement on a WUR signaling configuration between the base station and the UE may be required for communication. The WUR signaling configuration may include timing resource and/or frequency resource used for WUR signals. In an aspect, for example, the WUR signaling configuration may also include the assignment of one or more UEs for WUR signal occupying a specific timing and frequency resource. In an aspect, for example, the WUR signaling configuration may include the assignment of one or more UEs for WUR signal to one or more sequence.

Still referring to block 204, in some examples, determining a WUR signaling configuration can be done in various manners. As for one example, a WUR signaling configuration may be based on a SYNC signal. In this example scenario, the bandwidth and center frequency may be the same as the SYNC signal and the WUR signal may be fixed time offset away from the SYNC signal. In other examples, the determination of a WUR signaling configuration may be based on using the same configuration as the common control resource set (CORESET) wherein the common CORESET is used to transmit common PDCCH. In such an example, the information of common CORESET configuration may be available upon decoding PBCH. In other examples, the WUR signaling configuration may be communicated from a base station to a UE. In other examples, a base station may signal the WUR signaling configuration in SI and/or in a RRC message. The determination may be based on specifications in standards, specified by an operator, and/or based on static parameters including cell id, frequency band used. The determination may be dynamic. For example, determination may be based on the channel condition and/or usage of resource.

In an aspect, at block 206, the method 200 may include transmitting one or more WUR signals. The transmitted signal may be based on at least on the determined numerology and the determined WUR signaling configuration, to one or more wireless devices. For example, in an implementation, a base station may determine that the numerology be the same as a SYNC signal and WUR signaling configuration be based on the same SYNC signal. Then, at block 206, the base station may send a WUR signal with the same numerology and the same frequency resource as that of the SYNC signal at a pre-determined time after the SYNC signal. In an aspect, for example, if the base station has control and/or data to send to a UE that is in I-DRX, the base station may send a WUR signal to the UE prior to sending a paging message.

In an aspect, at block 208, the method 200 may include transmitting a paging message to the one or more wireless devices subsequent to transmitting one or more WUR signals. In an aspect, for example, a base station may send a paging message after sending a WUR signal so that the wireless device, e.g., UE, can decode the paging message. The bases station can send control and/or data to the UE after sending the paging message.

Although not presented in FIG. 2, a base station may optionally signal WUR signaling configuration dynamically. In an aspect, for example, upon detection of a UE handover to another cell the base station can use a different WUR signaling configuration for that UE and communicate the WUR signaling configuration to the UE. In addition, a base station may indicate its capability to support WUR signaling to a UE. In an aspect, for example, the base station may signal one bit in the system information (SI) to indicate whether WUR feature is supported by the base station.

Although not presented in FIG. 2, in an aspect, a base station may quasi-collocate one or more WUR signals to a SYNC signal. That is, the transmitted WUR signal may be similar to the SYNC signal in some aspects. For example, the WUR signal may be quasi-collocated with the SYNC signal with respect to a spatial parameter. That is, in an implementation, the WUR signal may be transmitted on the same beams that the SYNC signal was transmitted on. For example, the transmitted WUR signal may be quasi-collocated with the SYNC signal with respect to gain, delay, Doppler, or combination thereof. In an implementation, the WUR signal may have same or similar gain, delay, and/or Doppler as the SYNC signal.

Determination of WUR numerology in block 202 and the determination of WUR signaling configuration in block 204 may be done by a base station only at the start of base station power up, periodically, dynamically based on internal or external triggers. In addition, determination of WUR numerology in block 202 and the determination of WUR signaling configuration in block 204 may be with regards to a single, group of UEs, or all UE's in communication with the base station.

Figure 3:
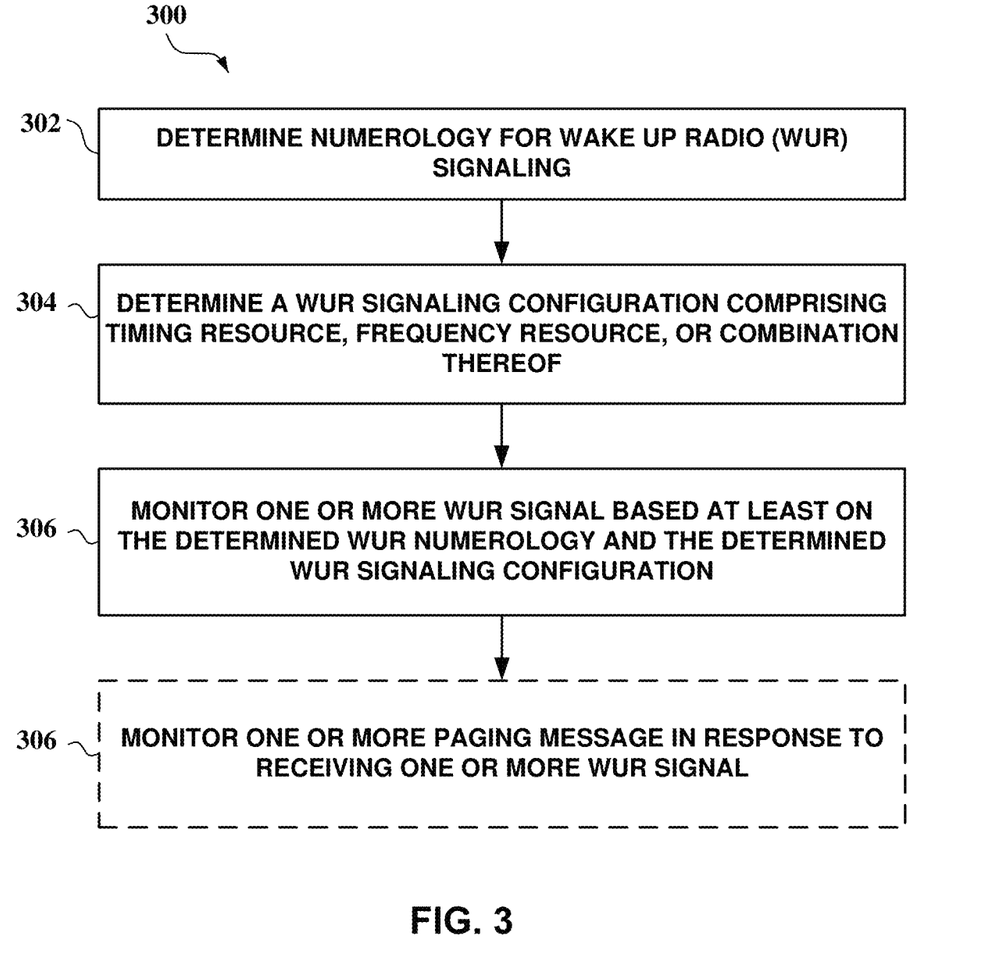
FIG. 3 illustrates an example of a technique for monitoring WUR signals in a wireless communications system, according to one or more of the presently described aspects.

Referring to FIG. 3, in an operational aspect, a UE, such as UE 115 in FIG. 1, may perform one or more aspects of a method 300 for determining WUR signal numerology and WUR signaling configuration. The UE may monitor WUR signals based on determining a WUR signal numerology and WUR signaling configuration (as discussed below in more detail). For example, the method 300 may describe a method of operation of a UE communicating with a base station operating the method 200 in FIG. 2.

In an aspect, at block 302, the method 300 may include determining numerology for WUR signals. Determining numerology for WUR signals may include determining subcarrier spacing and symbol length of the WUR signals. In some examples, numerology of the WUR signal may be determined to be the same numerology as a SYNC signal. That is, a UE may detect numerology of a received SYNC signal and then determine the numerology of the WUR signal to be the same. In some examples, numerology of WUR signals may be determined to be the same numerology as PDCCH or PDSCH carrying the remaining minimum system information (RMSI) of a cell. Numerology information of the PDCCH or PDSCH carrying RMSI may be available upon decoding PBCH. In some examples, numerology of WUR signals may be determined to be the same numerology as data or control signal numerology that is multiplexed in the same time slot as the WUR signal. In other examples, the numerology of WUR signals may be communicated from a base station to a UE. In such example, the UE may receive WUR numerology information in SI and/or in a RRC message. The determination may be based on specifications in standards, specified by an operator, and/or based on static parameters including cell id, UE id, frequency band used. The determination may be dynamic. For example, determination may be based on the channel condition and/or usage of resource.

In an aspect, at block 304, the method 300 may include determining a WUR signaling configuration comprising timing resource, frequency resource, or a combination thereof. In some examples, the WUR signaling configuration may be determined to be based on a SYNC signal. In such example, the bandwidth and center frequency may be the same as the SYNC signal and the WUR signals may be fixed time offset away from the SYNC signal. In some examples, the WUR signaling configuration may be determined to be the same configuration as the common control resource set (CORESET) wherein the common CORESET is used to transmit common PDCCH. In such example, the common CORESET configuration may be available upon decoding PBCH. In other examples, the WUR signaling configuration may be communicated from a base station to a UE. In such example, the UE may receive WUR signaling configuration information in SI and/or in a RRC message. The determination may be based on specifications in standards, specified by an operator, and/or based on static parameters including cell id, UE id, frequency band used. The determination may be dynamic. For example, determination may be based on the channel condition and/or usage of resource.

In an aspect, at block 306, the method 300 may include monitoring one or more WUR signals, based on at least on the determined WUR numerology and the determined WUR signaling configuration. In an aspect, for example, if a base station has control and/or data to send to UEs that are in I-DRX, the base station may send WUR signals to the UEs prior to sending paging messages. In an aspect, for example, a UE may monitor and receive the WUR signal sent by the base station based on the determined WUR numerology and WUR signaling configuration.

In an aspect, at block 308, the method 300 may optionally include monitoring one or more paging signals in response to receiving the one or more WUR signals. In an aspect, for example, if a UE detects a WUR signal based on the determined WUR numerology and determined WUR signaling configuration then the UE may proceed to monitor and decode PDCCH to receive paging messages. In an alternative aspect, for example, if the UE does not detect any WUR signals then the UE may return to an off state of I-DRX and not monitor PDCCH.

Although not presented in FIG. 3, the UE may optionally monitor one or more beams for receiving WUR signals based on a beam sweep of SYNC signals. In an implementation, for example if WUR signals are quasi-collocated with the SYNC signal with respect to spatial parameter, then upon successful beam sweep of a SYNC signal the UE may monitor WUR signal only on the beams that the UE received the SYNC signal successfully and not need to beam sweep all the beams to receive the WUR signal. Doing so may in some instances further reduce the UE's power consumption by monitoring smaller number of beams than compared to the standard beam sweep thereby reducing the wake time of the UE and UE processing. In an implementation, the UE may assume that the gain, delay, and/or Doppler of the WUR signal to be the same or similar to that of the SYNC signal. Doing so may in some instances further reduce the UE's power consumption by acquiring the WUR signal based on the assumed gain, delay, and/or Doppler than compared to the standard requirement to determine gain, delay, and/or Doppler.

In addition, although not presented in FIG. 3, a UE may enable the monitoring of WUR signals based on an indication from a base station that it is capable of supporting the WUR signaling feature. In an aspect, for example, the UE may enable the monitoring of WUR signals after observing a bit in the system information (SI) being set. UE may not enable the monitoring of WUR signals if the bit in SI is not set.

Determination of WUR numerology in block 302 and the determination of WUR signaling configuration in block 304 may be done by a UE only at the start of the UE power up, periodically, dynamically based on internal or external triggers. In addition, determination of WUR numerology in block 202 and the determination of WUR signaling configuration in block 204 may be with regards to a single base station, group of base stations, or all base station's in communication with the UE.

Figure 4:
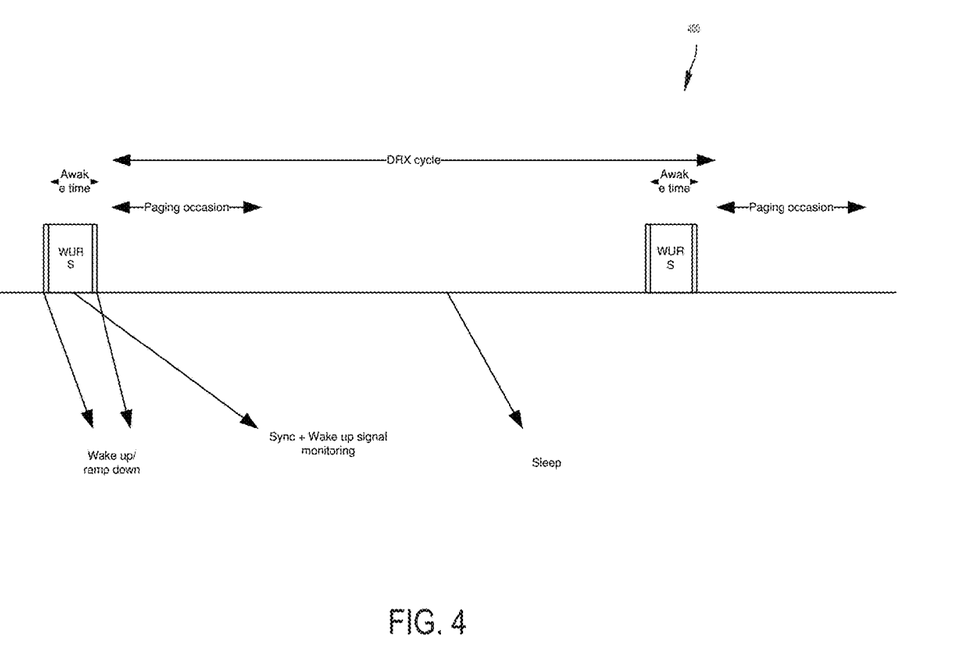
FIG. 4 illustrates an example of a user equipment (UE) processing WUR signals according to one or more of the presently described aspects.

Referring to FIG. 4, a flow diagram 400 illustrates an example flow diagram of a UE process for WUR signaling when there is no WUR signal for the UE, according to one or more of the presently described aspects. The UE may wake to monitor a WUR signal periodically based on an I-DRX cycle and I-DRX parameters. Upon waking up, the UE may sync to the base station based on the SYNC signal. According to the method 300 in FIG. 3, the UE may monitor the channel for WUR signal based on the determined WUR numerology and WUR signaling configuration. In an example, if the UE does not detect a WUR signal assigned for it then the UE may ramp down and remain in sleep until the end of the I-DRX cycle whereby the UE wakes up again to monitor WUR signal.

Figure 5:
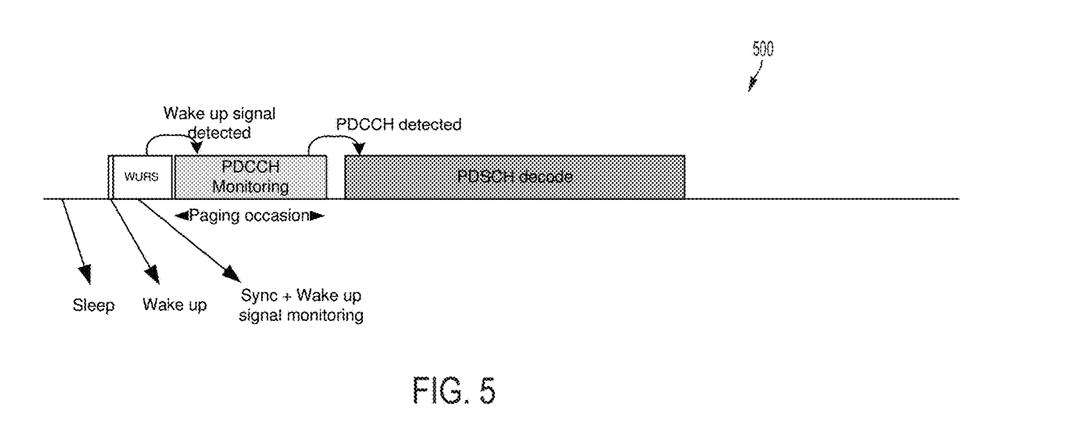
FIG. 5 illustrates another example of a UE processing WUR signals according to one or more of the presently described aspects.

Referring to FIG. 5, a flow diagram 500 illustrates an example flow diagram of a UE process for WUR signaling when there are one or more WUR signals for the UE, according to one or more of the presently described aspects. The UE may wake up to monitor a WUR signal periodically based on the I-DRX cycle and I-DRX parameters. Upon waking, the UE may sync to the base station based on a SYNC signal. The UE may monitor the channel for WUR signal destined for the UE based on the determined WUR numerology and WUR signaling configuration according to the method 300 in FIG. 3. In an example, if the UE does detect a WUR signal assigned for it then the UE may monitor PDCCH to receive a paging message. If the UE does receive a paging message destined for it, then the UE may decode PDSCH to receive control and/or data message.

Figure 6:
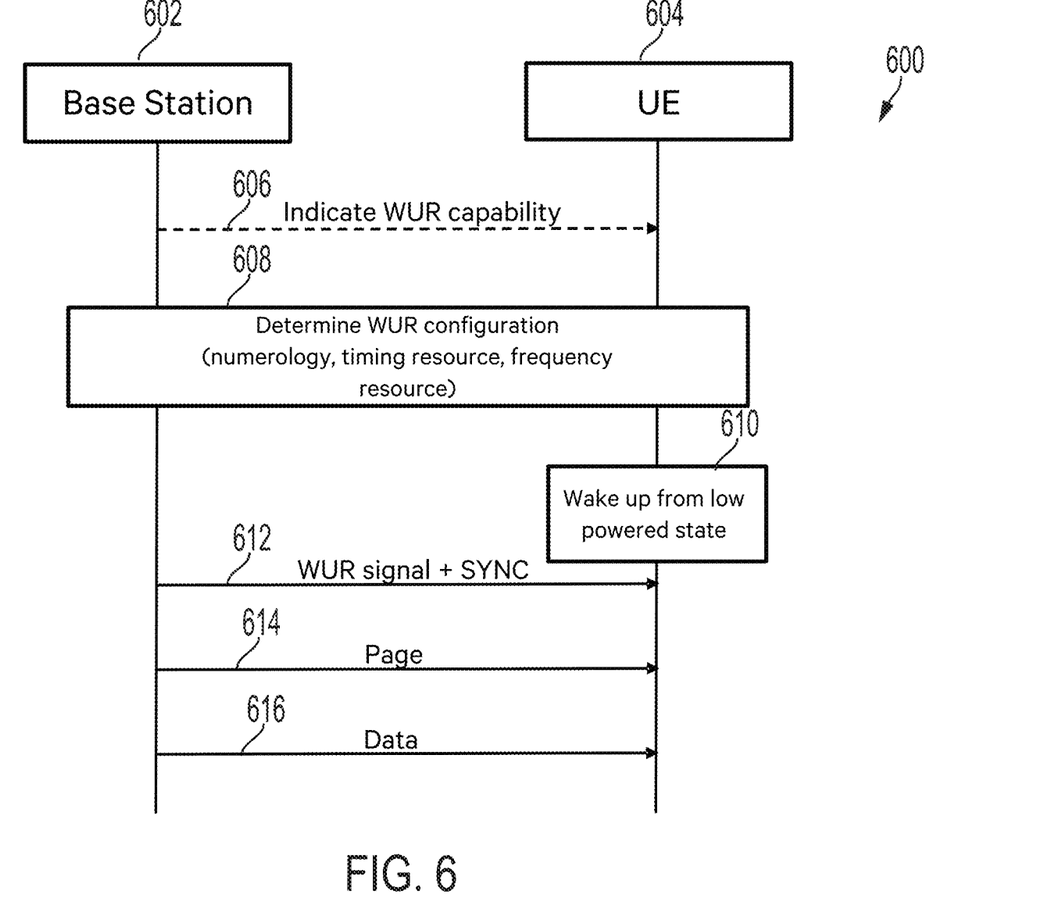
FIG. 6 illustrates communications in an example system that utilizes WUR signals, according to one or more of the presently described aspects.

Referring to FIG. 6, a message flow 600 illustrates an example communication system within a wireless communication system that employs a WUR signal to reduce UE power consumption. The communication system 600 includes a base station 602, such as base station 105 in FIG. 1, that communicates with a UE 604, such as UE 115 in FIG. 1. While FIG. 6 illustrates an example communication system with a single UE 604, the example communication system 600 is intended to operate with any number of UEs, with UE 604 being exemplary of a UE in the system 600. The base station 602 may optionally use a message 606 indicate to the UE 604 regarding its WUR capability. The UE 604 may, upon receiving the WUR capability of base station 602, may pursue the WUR signal process if the base station indicates it is WUR capable or may pursue the I-DRX process without WUR signal if the base station indicates it is not WUR capable. Upon determining to use WUR signal process, in 608, the base station 602 and UE 604 may determine the WUR numerology and determine the WUR signaling configuration. The UE 604 in step 610 may wake up to monitor WUR signal based on the determined numerology and configuration during the on-duration duration specified by the I-DRX process. Subsequently, base station 602 may send SYNC and WUR signal and the UE 604 monitors and receives wherein WUR signal is based on the determined numerology and configuration. After SYNC and WUR signal 612 is transmitted to the UE, the base station may send paging message 614 and then send control and/or data 616 to the UE.

Figure 7:
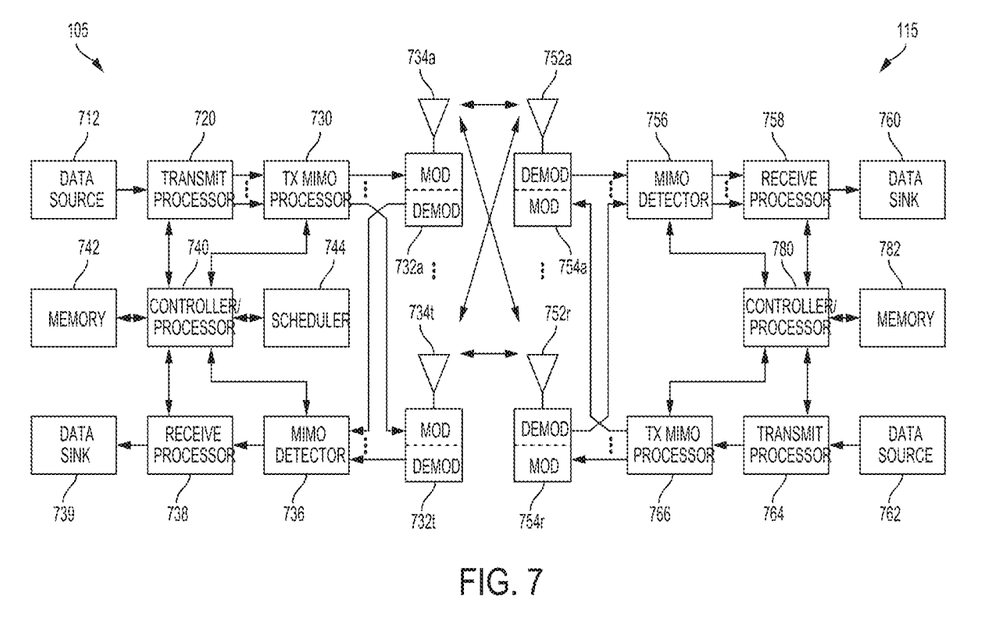
FIG. 7 is a block diagram illustrating an example of a base station (e.g., an eNB or a gNB) communicating with a UE in an access network, according to one or more of the presently described aspects.

FIG. 7 shows a block diagram of a design of base station/eNB 105 and UE 115. The base station/eNB 105 and UE 105 may be one of the base stations/eNBs and one of the UEs in FIG. 1. For a restricted association scenario, the eNB 105 may be small cell eNB 105z in FIG. 1, and UE 115 may be UE 115z. In such a restricted association scenario, in order to access small cell eNB 105z, UE 115z would be included in a list of accessible UEs for small cell eNB 105z. eNB 105 may also be a base station of some other type. eNB 105 may be equipped with antennas 734a through 734t, and UE 115 may be equipped with antennas 752a through 752r.

At eNB 105, transmit processor 720 may receive data from data source 712 and control information from controller/processor 740. The control information may be for the PBCH, PCFICH, PHICH, PDCCH, etc. The data may be for the PDSCH, etc. Transmit processor 720 may process (e.g., encode and symbol map) the data and control information to obtain data symbols and control symbols, respectively. Transmit processor 720 may also generate reference symbols, e.g., for the PSS, SSS, and cell-specific reference signal. Transmit (TX) multiple-input multiple-output (MIMO) processor 730 may perform spatial processing (e.g., precoding) on the data symbols, the control symbols, and/or reference symbols, if applicable, and may provide output symbol streams to modulators (MODs) 732a through 732t. Each modulator 732 may process a respective output symbol stream (e.g., for OFDM, etc.) to obtain an output sample stream. Each modulator 732 may additionally or alternatively process (e.g., convert to analog, amplify, filter, and upconvert) the output sample stream to obtain a downlink signal. Downlink signals from modulators 732a through 732t may be transmitted via antennas 734a through 734t, respectively.

At UE 115, antennas 752a through 752r may receive the downlink signals from eNB 105 and may provide received signals to demodulators (DEMODs) 754a through 754r, respectively. Each demodulator 754 may condition (e.g., filter, amplify, downconvert, and digitize) a respective received signal to obtain input samples. Each demodulator 754 may further process the input samples (e.g., for OFDM, etc.) to obtain received symbols. MIMO detector 756 may obtain received symbols from all demodulators 754a through 754r, perform MIMO detection on the received symbols if applicable, and provide detected symbols. Receive processor 758 may process (e.g., demodulate, deinterleave, and decode) the detected symbols, provide decoded data for UE 115 to data sink 760, and provide decoded control information to controller/processor 780.

On the uplink, at UE 115, transmit processor 764 may receive and process data (e.g., for the PUSCH) from data source 762 and control information (e.g., for the PUCCH) from controller/processor 780. Transmit processor 764 may also generate reference symbols for a reference signal. The symbols from transmit processor 764 may be precoded by TX MIMO processor 766 if applicable, further processed by modulators 754a through 754r (e.g., for SC-FDM, etc.), and transmitted to eNB 105. At eNB 105, the uplink signals from UE 115 may be received by antennas 734, processed by demodulators 732, detected by MIMO detector 736 if applicable, and further processed by receive processor 738 to obtain decoded data and control information sent by UE 115. Processor 738 may provide the decoded data to data sink 739 and the decoded control information to controller/processor 740.

Controllers/processors 740 and 780 may direct the operation at eNB 105 and UE 115, respectively. Memories 242 and 282 may store data and program codes for eNB 105 and UE 115, respectively. Scheduler 244 may schedule UEs for data transmission on the downlink and/or uplink. For example, one or more of the controller/processor 740, the memory 742, the scheduler 744, the modulator 732, the antenna 734, and/or other modules at eNB 105 may perform the methods illustrated in FIG. 2 and FIG. 6 and/or the techniques described herein. For example, one or more of the controller/processor 780, the memory 782, the modulator 752, the antenna 752, and/or other modules at UE 115 may perform the methods illustrated in FIG. 3-FIG. 6 and/or the techniques described herein. In an implementation, for example, block 202 and block 204 of method 200 in FIG. 2 may be implemented by the controller/processor 740 or by the controller/processor 740 and memory 742. In addition, block 206 and block 208 of method 200 in FIG. 2 may be implemented by a combination of antennas 734a-734t, TX MIMO processor 730, 720 transmit processor, and controller/processor 740. In an implementation, for example, block 302 and block 304 of method 300 in FIG. 3 may be implemented by the controller/processor 780 or by the controller/processor 780 and memory 782. In addition, block 306 and block 308 of method 300 in FIG. 3 may be implemented by a combination of antennas 752a-752r, MIMO detector 756, receive processor 758, and controller/processor 780.

Several aspects of a telecommunications system have been presented with reference to an LTE/LTE-A or a 5G NR system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications performed by a base station (BS), comprising:
   selecting a numerology for wake-up-radio (WUR) signaling from a plurality of numerology, wherein the selecting the numerology of WUR signaling is based on a numerology of SYNC signal, a numerology of PDCCH and/or PDSCH carrying remaining minimum system information (RMSI), a numerology of paging channels, or a combination thereof;
   determining a WUR-signaling configuration comprising time resource, frequency resource, or a combination thereof;
   transmitting one or more WUR signals, based at least on the numerology and the determined WUR-signaling configuration, to one or more wireless devices; and
   transmitting a paging message to the one or more wireless devices after transmitting the one or more WUR signals.

2. The method of claim 1, further comprising basing the determination of the WUR-signaling configuration on a SYNC signal, a common control resource set (CORESET), or a combination thereof.

3. The method of claim 1, further comprising transmitting the one or more WUR signals in response to determining the one or more wireless devices are in a low powered operation.

4. The method of claim 1, further comprising transmitting an indication of WUR-signaling support capability to the one or more wireless devices.

5. The method for wireless communications performed by a base station (BS), comprising:
   selecting a numerology for wake-up-radio (WUR) signaling from a plurality of numerology;
   determining a WUR-signaling configuration comprising time resource, frequency resource, or a combination thereof;
   transmitting one or more WUR signals, based at least on the numerology and the determined WUR-signaling configuration, to one or more wireless devices, wherein the one or more WUR signals are quasi-collocated with a SYNC signal with respect to spatial parameter, gain, delay, Doppler or combination thereof; and
   transmitting a paging message to the one or more wireless devices after transmitting the one or more WUR signals.

6. A method for wireless communication performed by a wireless device, comprising:
- determining a numerology of wake-up-radio (WUR) signaling from a plurality of numerology, wherein the determine the numerology of WUR signaling is based on a numerology of SYNC signal, a numerology of PDCCH and/or PDSCH carrying remaining minimum system information (RMSI), a numerology indicated in a system information (SI) and/or a radio resource control (RRC) message, or a combination thereof;
- determining a WUR-signaling configuration comprising time resource, frequency resource, or a combination thereof; and
- monitoring one or more WUR signals based at least on the determined numerology and the determined WUR signaling configuration.

7. The method of claim 6, further comprising monitoring one or more paging messages in response to receiving the one or more WUR signals.

8. The method of claim 6, further comprising basing the determination of the WUR-signaling configuration on a SYNC signal, a common control resource set (CORESET), receiving the WUR-signaling configuration in a system information (SI) and/or a radio resource control (RRC) message, or a combination thereof.

9. A method for wireless communication performed by a wireless device, comprising:
- determining a numerology of wake-up-radio (WUR) signaling from a plurality of numerology;
- determining a WUR-signaling configuration comprising time resource, frequency resource, or a combination thereof; and
- monitoring one or more WUR signals based at least on the determined numerology and the determined WUR signaling configuration, wherein monitoring the one or more WUR signals comprises monitoring one or more beams used for acquiring one or more SYNC signals.

10. The method of claim 9, further comprising receiving the one or more WUR signals based on the one or more beams used for acquiring the one or more SYNC signals.

11. An apparatus for wireless communication, comprising:
- a memory; and
- at least one processor coupled to the memory and configured to:
  - select a numerology for wake-up-radio (WUR) signaling from a plurality of numerology, wherein the selecting the numerology of WUR signaling is based on a numerology of SYNC signal, a numerology of PDCCH and/or PDSCH carrying remaining minimum system information (RMSI), a numerology of paging channels, or a combination thereof;
  - determine a WUR-signaling configuration comprising time resource, frequency resource, or a combination thereof;
  - transmit one or more WUR signals, based at least on the numerology and the determined WUR-signaling configuration, to one or more wireless devices; and
  - transmit a paging message to the one or more wireless devices after transmitting the one or more WUR signals.

12. The apparatus of claim 11, further comprising basing the determination of the WUR-signaling configuration on a SYNC signal, a common control resource set (CORESET), or a combination thereof.

13. The apparatus of claim 11, further comprising transmitting the one or more WUR signals in response to determining the one or more wireless devices are in a low powered operation.

14. The apparatus of claim 11, further comprising transmitting an indication of WUR-signaling support capability to the one or more wireless devices.

15. An apparatus for wireless communication, comprising:
- a memory; and
- at least one processor coupled to the memory and configured to:
  - select a numerology for wake-up-radio (WUR) signaling from a plurality of numerology;
  - determine a WUR-signaling configuration comprising time resource, frequency resource, or a combination thereof;
  - transmit one or more WUR signals, based at least on the numerology and the determined WUR-signaling configuration, to one or more wireless devices, wherein the one or more WUR signals are quasi-collocated with a SYNC signal with respect to spatial parameter, gain, delay, Doppler or a combination thereof; and
  - transmit a paging message to the one or more wireless devices after transmitting the one or more WUR signals.

16. An apparatus for wireless communication, comprising:
- a memory; and
- at least one processor coupled to the memory and configured to:
  - determine a numerology of wake-up-radio (WUR) signaling from a plurality of numerology, wherein the determine the numerology of WUR signaling is based on a numerology of SYNC signal, a numerology of PDCCH and/or PDSCH carrying remaining minimum system information (RMSI), a numerology indicated in a system information (SI) and/or a radio resource control (RRC) message, or a combination thereof;
  - determine a WUR-signaling configuration comprising time resource, frequency resource, or a combination thereof; and
  - monitor one or more WUR signals based at least on the determined numerology and the determined WUR-signaling configuration.

17. The apparatus of claim 16, further comprising monitoring one or more paging messages in response to receiving the one or more WUR signals.

18. The apparatus of claim 16, further comprising the determination of WUR-signaling configuration on a SYNC signal, a common control resource set (CORESET), receiving the WUR-signaling configuration in a system information (SI) and/or a radio resource control (RRC) message, or a combination thereof.

19. An apparatus for wireless communication, comprising:
- a memory; and
- at least one processor coupled to the memory and configured to:
  - determine a numerology of wake-up-radio (WUR) signaling from a plurality of numerology;
  - determine a WUR-signaling configuration comprising time resource, frequency resource, or a combination thereof; and monitor one or more WUR signals based at least on the determined numerology and the determined WUR-signaling configuration wherein monitoring the one or more WUR signals comprises monitoring one or more beams used for acquiring one or more SYNC signals.

20. The apparatus of claim 19, further comprising receiving the one or more beams based on the one or more beams used for acquiring the one or more SYNC signals.

* * * * *